June 2, 1953  A. R. JOHNSON  2,640,303
KNIFE SHARPENING AND GRINDING ATTACHMENT
Filed July 2, 1951  3 Sheets-Sheet 1
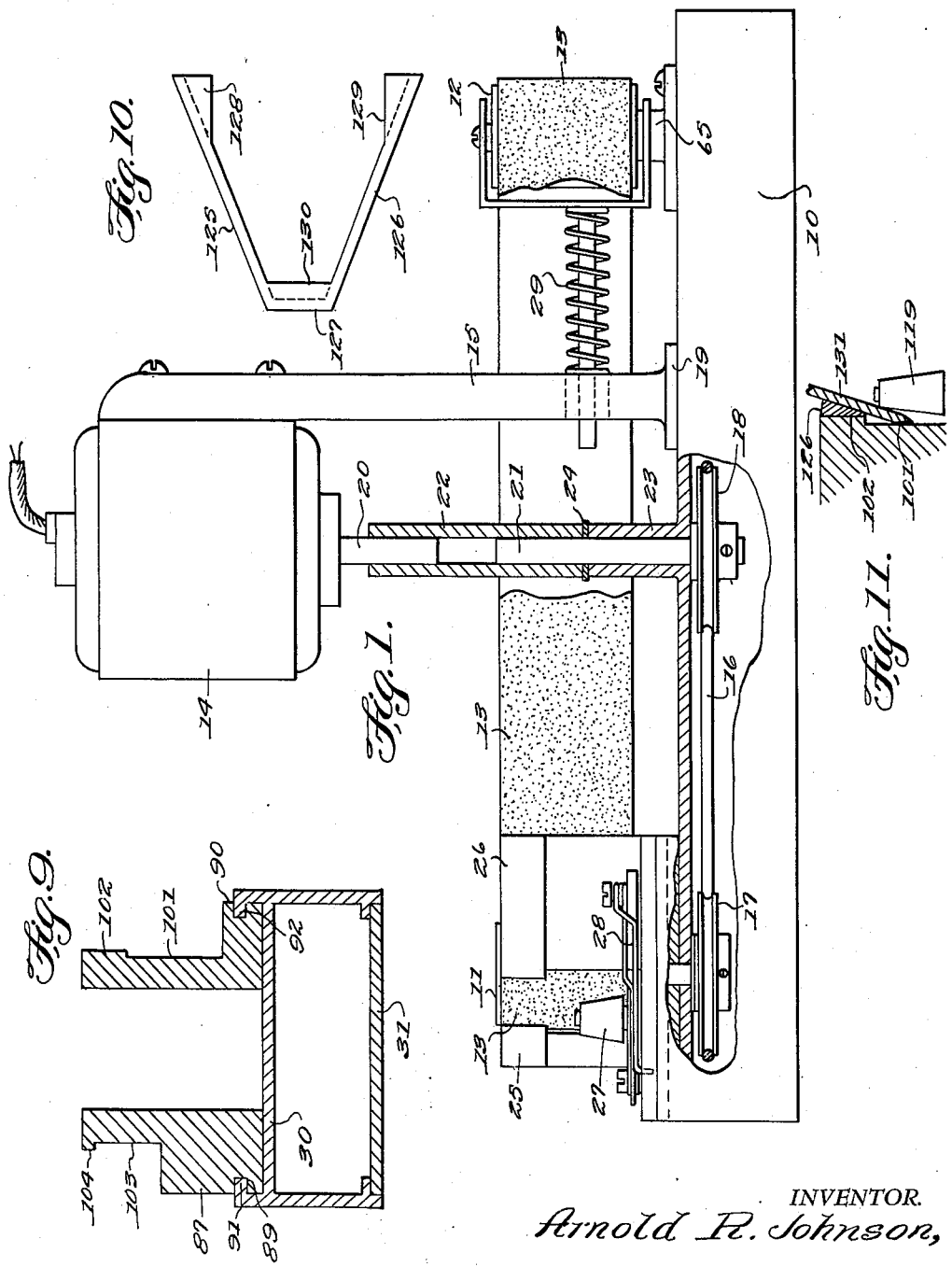
INVENTOR.
Arnold R. Johnson,
BY Victor J. Evans & Co.
ATTORNEYS

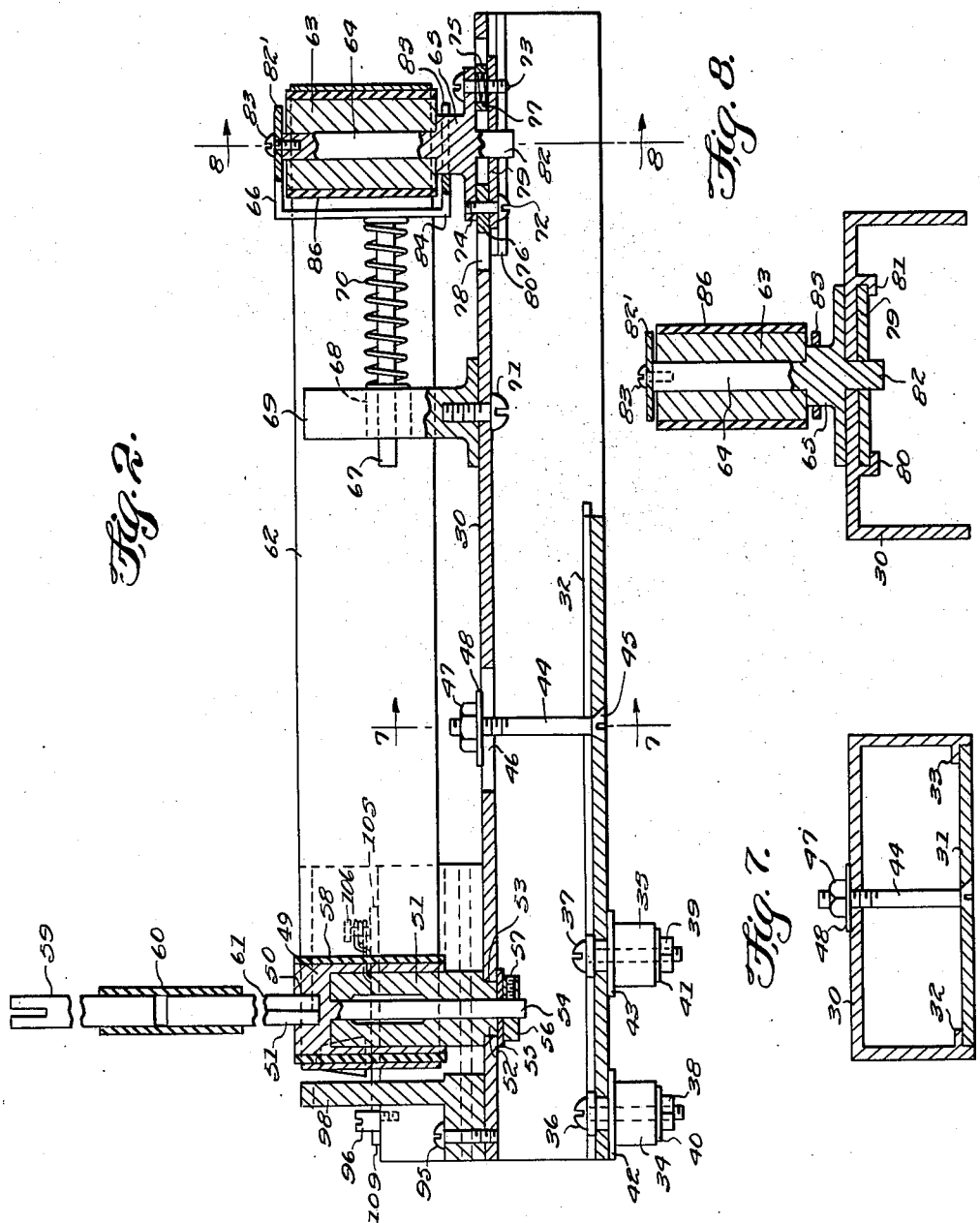

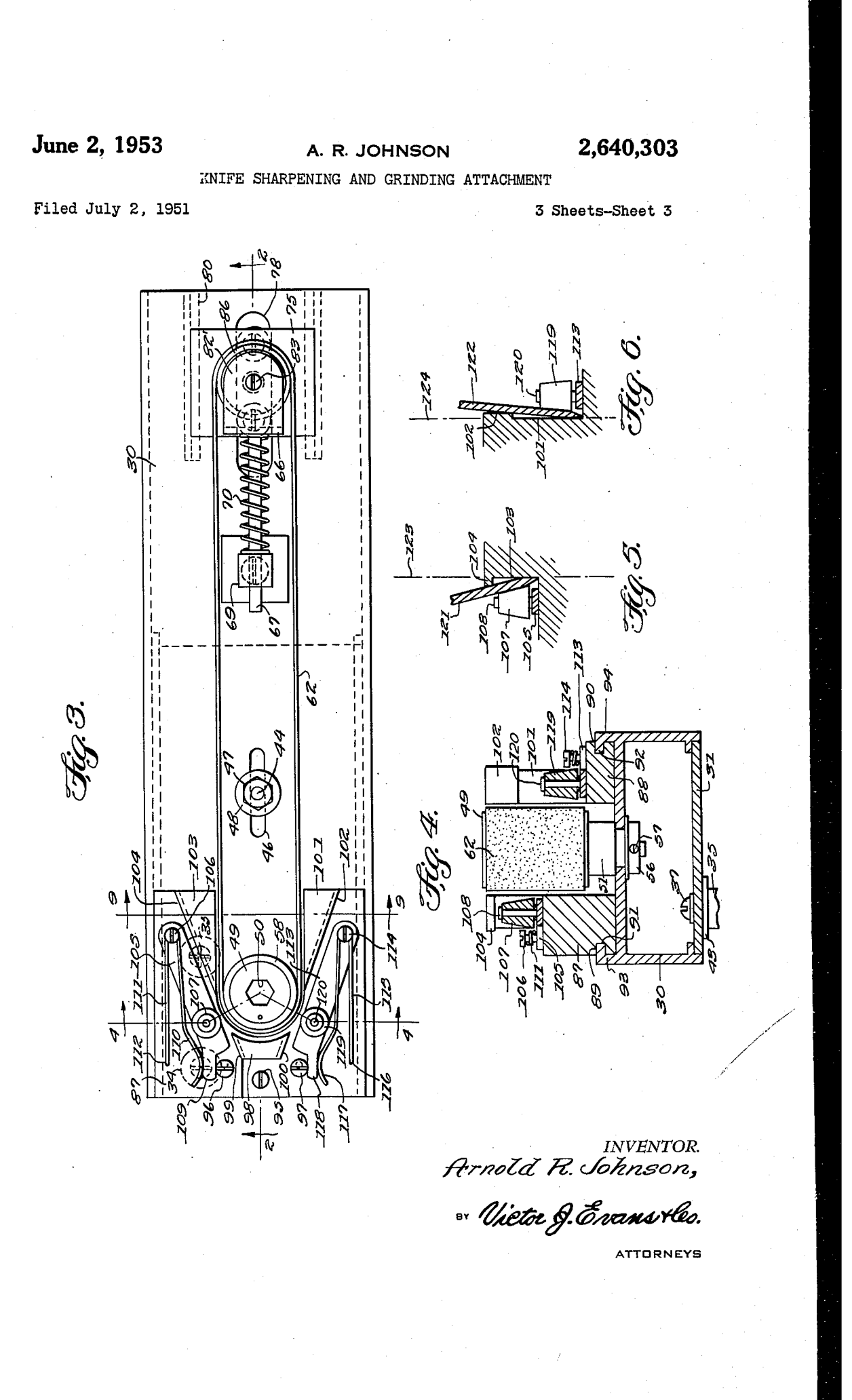

Patented June 2, 1953

2,640,303

UNITED STATES PATENT OFFICE 2,640,303

KNIFE SHARPENING AND GRINDING ATTACHMENT

Arnold R. Johnson, Underwood, N. Dak.

Application July 2, 1951, Serial No. 234,757

3 Claims. (Cl. 51—135)

This invention relates to devices for grinding and sharpening knives particularly kitchen knives, and in particular sharpening and grinding machines for knives and other devices having sharp edges wherein a continuous belt having a grinding outer surface is mounted on vertically positioned pulleys with suitable guides positioned adjacent one of the pulleys for holding knives and the like at proper angles in relation to the grinding belt and in which resilient take up means is provided in combination with one of the pulleys for maintaining constant tension in the continuous belt.

The purpose of this invention is to provide a comparatively small, compact grinding machine for household and domestic use wherein a knife blade or other device having a sharp edge is secured by clamping elements against the surface of a grinding belt with the cutting edge of the blade held at a proper angle in relation to the belt.

Various types of grinders have been provided for small knives and particularly kitchen knives but where a knife is held against a grinding wheel it is difficult for the average layman to hold the knife at the proper angle and knives are constantly burned and otherwise damaged by inexperienced persons attempting to hold the cutting edges of knives in grinding relation to a grinding wheel or the like. With this thought in mind this invention contemplates a knife grinder wherein means is provided for positioning a knife in relation to a grinding element whereby the cutting edge of a knife may readily be ground to the proper angle for efficient cutting.

The object of this invention is, therefore, to provide means for forming a small grinding machine so that knives and other sharp edge devices or tools may be correctly positioned in relation to a grinding element.

Another object of this invention is to provide a knife grinding machine particularly adapted for kitchen use and that is adapted to be operated by the spindle of a conventional mixing or beating machine.

A further object of the invention is to provide a small grinder for knives and other implements that is particularly adapted for household use, which is of a simple and economical construction.

With these and other objects and advantages in view the invention embodies a pair of vertically disposed pulleys carried by a base and having an endless belt with a grinding outer surface trained over the pulleys, with means for maintaining constant tension in the belt, with means for holding knives and other implements in driving relation to the belt, and with means by which the belt may be rotated.

Other features and advantages of the invention will appear from the following description taken in connection with the drawings wherein:

Figure 1 is a side elevational view illustrating the portable grinder with parts broken away and shown in section and in which the grinder is operated by a motor with pulleys and a belt.

Figure 2 is a similar view showing a longitudinally disposed section through the grinding wheel and illustrating a modification wherein the motor, pulleys and belt are omitted and the grinder is actuated by a spindle of a mixer, beater, or the like, said section being taken on line 2—2 of Figure 3.

Figure 3 is a plan view of the grinder with the parts as shown in Figure 2.

Figure 4 is a cross section through the grinder shown in Figure 3 being taken on line 4—4 thereof.

Figure 5 is a detail illustrating guides for holding a knife blade in grinding position.

Figure 6 is a similar detail showing the position of a guide for holding a blade to obtain a different taper.

Figure 7 is a cross section through the mounting base of the grinder being taken on line 7—7 of Figure 2.

Figure 8 is a cross section taken on line 8—8 of Figure 2.

Figure 9 is a similar section being taken on line 9—9 of Figure 3.

Figure 10 is a detail showing a plan view of a retaining cap for holding a knife blade in the guides with the cutting edges of the knives in grinding relation with the belt.

Figure 11 is a detail similar to that illustrated in Figures 5 and 6 illustrating the use of a mounting strip for holding the knife blade in a grinding position.

Referring now to the drawings wherein like reference characters denote corresponding parts, the knife grinder, as illustrated in Figure 1 is formed with a channel-shaped base 10 having vertically disposed pulleys 11 and 12 with a band 13 having a grinding outer surface trained over the pulleys. The pulleys are rotated by a motor 14 carried by a post 15 on the base 10 and the motor drives the pulley 11 through a belt 16 which is trained over pulleys 17 and 18.

The post 15 is mounted on the channel-shaped base 10 through a flange 19 and the motor shaft 20 is connected to the shaft 21, on the lower end of which the pulley 18 is positioned, by a coupling sleeve 22. The sleeve extends upwardly from the hub 23 on the base 10 with a friction washer 24 between the upper end of the hub and lower end of the coupling sleeve.

The knife grinder is provided with guides 25 and 26, which in combination with frustro-conical shaped rollers 27 and spring arms 28 retain knives in cutting relation with the grinding surface of the belt or band 13. Tension is maintained in the grinding belt by a spring 29 which is similar to the spring in the design illustrated in Figure 2.

In the design illustrated in Figures 2 and 3 wherein the grinding machine may be operated by a conventional kitchen mixer or the like a base 30 channel-shaped in cross section is mounted through a plate 31 on a table, stand, or the like with the plate 31 secured in recesses below ribs 32 and 33. The plate 31 is provided with lugs 34 and 35 for mounting the device on the base of a mixer, or the like and the lugs are secured to the plate by screws 36 and 37, respectively and with nuts 38 and 39 on the ends of the screws. Washers 40 and 41 may be placed between the nuts and lugs and friction washers 42 and 43 are provided between the lugs and under surface of the plate 31. The plate 31 is secured in position by a screw 44 having a countersunk head 45 and the screw extends through a slot 46 in the web of the channel 30 with the upper end held by a nut 47. A washer 48 is positioned between the nut and upper surface of the web. It will be understood that the base 30 may be provided with other suitable means whereby the grinder may be attached to the base of a mixer, beater, or other machine or device.

With the parts arranged in this manner a head pulley 49 with a socket 50 in the upper end is journaled over a cylindrical plug 51, the lower end of which is provided with an extending stud 52 that is secured in an opening 53 in the web of the base by a stem 54 extended through the member 51 and a washer 55, as shown in Figure 2. The lower end of the stem 54 is provided with a set collar 56 having a screw 57 therein. By this means the pulley 49 is journaled on the base and, as illustrated in Figure 2, the pulley is provided with a sleeve 58 that may be formed of rubber or other suitable material.

The pulley 49 may be driven from a mixer or the like with the spindle 59 of the mixer extended into a coupling member 60 in the upper end of an auxiliary spindle 61.

A grinding belt 62 is positioned over the pulley 49 and also held over a similar tail pulley 63, at the opposite end, that is mounted on a spindle 64 having a base 65 and the spindle is held in a yoke 66 from which a bar 67 extends. The bar 67 extends through an opening 68 in a guide post 69 on the base 30 and a spring 70 urges the yoke away from the guide post whereby the grinding belt is continuously held in tension.

The post 69 is mounted on the web of the base 30 by a screw 71 and the spindle 64 is mounted through the base 65 of the channel-shaped base 30 by screws 72 and 73 which extend through flanges 74 extended from the base 65, and through washers 76 and 77 in a slot 78 of the web of the base, the lower ends of the screws being held in a plate 79. The plate 79 is slidably mounted in slots in parallel ribs 80 and 81 positioned on the under surface of the web of the base. The spindle 64 is also provided with a stud 82 that extends through the plate 79.

A spring 75 is placed around the screw 73 in the washer 77 for urging the outer side of the base 65 upwardly so as to tilt pulley 63 somewhat in order to run the belt 62 high or low on the pulleys 49 and 63 whereby full use of the grinding belt is obtained. The position of the belt is, therefore, regulated by the screw 73.

An arm 82' on the upper end of the yoke 66 is secured to the upper end of the spindle 64 with a screw 83 and the arm 84 forming the lower part of the yoke is provided with fingers 85 that extend over the base 65 of the spindle.

The pulley 63 is also covered with a sleeve 86, similar to the sleeve 58 which is formed of rubber or other suitable resilient material.

In order to correctly position knives and other implements in relation to the grinding belt 62 the machine is provided with a guide 87 which, through grooves 89 and 90 in the sides, is slidably held on tongues 91 and 92 that extend inwardly from flanges 93 and 94, respectively, on the upper edges of the base 30 and this guide is secured in position by a screw 95.

The guide is provided with screws 96 and 97, the heads of which are off-center, and these screws are positioned to engage projections 118 and 109 of arms 105 and 113, to limit the positions of the tapered rollers 107 and 119 in relation to the belt 62.

The block 87 is provided with an upwardly extended guide 98 that is positioned on the center of the grinding belt and the edges of the guide 98 are provided with projections 99 and 100 which facilitate holding the blade of a knife against the surface of the guide and grinding belt.

One side of the block 87 is also provided with a guide 101 having a ridge 102 on the upper end and a similar guide 103 on the opposite side of the block is provided with a corresponding ridge 104.

The device is provided with an arm 105 that is pivotally mounted by a screw 106 on the block 87 and the arm 105 is provided with a frustro-conical guiding member 107 that is mounted on a pin 108.

The arm 105 is provided with an extension 109 that engages the head of the screw 96 to limit inward movement of the arm and conical shaped member 107 and the arm is resiliently held by a spring positioned around the screw 106 and having an end 110 bearing against the extension 109 and also an end 111 the end of which extends into an opening 112 in the block 87.

A similar spring is provided for holding an arm 113 that is pivotally mounted on the opposite side of block 87 by a screw 114 and this spring is provided with an arm 115 the end of which extends into an opening 116 in the block 87, and also an arm 117 that bears against an extension 118. The arm 113 bears against the head of the screw 97.

The arm 113 is also provided with a conical shaped member 119 that is mounted on a pin 120 and, as illustrated in Figures 5 and 6 these parts are positioned to hold knife blades, as indicated by the numerals 121 and 122 in grinding relation to the face of the grinding belt as indicated by the dotted lines 123 and 124, in Figures 5 and 6, respectively.

The machine is also provided with a triangular shaped cap having wedge-shaped arms 125 and 126 connected by a cross member 127, as shown in Figure 10 and this cap is positioned over the guide for retaining knife blades and the like in grinding position with the cutting edges of knife blades being held by flanges 128 and 129 on the upper edges of the arms 125 and 126 and also by a flange 130 on the cross member 127. By this means the blades 131 of knives may readily be held in position as the cutting edges are ground by the belt 62.

With the parts arranged in this manner knives and other implements having sharp cutting edges may readily be positioned to engage the surface of the belt and, as illustrated in Figures 5, 6 and 11, the blades may be held in position and ground with the cutting edges ground to the most efficient angles for cutting.

It will be understood that holding devices such as the guides 98, 101 and 103 with the frustroconical shaped members 107 and 119 are also used in combination with the grinder shown in Figure 1 whereby knives may be held on the belt 13 with the knives positioned as illustrated in Figures 5, 6 and 11.

The unique knife grinding machine of this invention may, therefore, be driven by an independent motor or may be operated by a spindle or shaft of a food mixer, beater, or other motor operated kitchen machine.

It will be understood that other modifications may be made in the design and arrangement of the parts without departing from the spirit of the invention.

What is claimed is:

1. In a grinder, the combination which comprises a base, channel-shaped in cross section, a vertically positioned head pulley journaled on the base, a vertically positioned tail pulley journaled on a spindle slidably mounted on the base, a belt having a grinding outer surface trained over the said pulleys, means resiliently urging the tail pulley away from the head pulley, means rotating the said head pulley for driving the belt, guide elements positioned at the sides of the said head pulley, means retaining cutting blades on the said guide elements, frustroconical shaped members positioned to coact with the guide members for holding blades, and means resiliently urging said frustro-conical shaped members toward the grinding belt.

2. In a knife grinder, the combination which comprises a base channel-shaped in cross section, a vertically positioned head pulley journaled on the base, a vertically positioned tail pulley slidably mounted on the base, means resiliently urging the tail pulley away from the head pulley, a belt having a grinding outer surface trained over the said pulleys, vertically positioned guides mounted on the base and positioned to coact with the belt for retaining knives in grinding relation to the belt, arms pivotally mounted on the base and spaced from the guides, frustroconical shaped members carried by the arms and positioned to engage knives positioned in the guides, resilient means urging the arms with the frustro-conical shaped members thereon toward the belt, and means limiting inward movement of the arms, said head pulley having a socket in the upper end by which the pulley is rotated by a spindle of a mixer or the like.

3. In a knife grinder, the combination which comprises a base channel-shaped in cross section, a vertically positioned head pulley journaled on the base, a vertically positioned tail pulley slidably mounted on the base, means resiliently urging the tail pulley away from the head pulley, a belt having a grinding outer surface trained over the said pulleys, vertically positioned guides mounted on the base and positioned to coact with the belt for retaining knives in grinding relation to the belt, arms pivotally mounted on the base and spaced from the guides, frustro-conical shaped members carried by the arms and positioned to engage knives positioned in the guides, resilient means urging the arms with the frustro-conical shaped members thereon toward the belt, means limiting inward movement of the arms, a motor mounted on the base, and means rotating the head pulley for driving the belt by the motor.

ARNOLD R. JOHNSON.

References Cited in the file of this patent

UNITED STATES PATENTS

| Number | Name | Date |
|---|---|---|
| 557,462 | Wenchel | Mar. 31, 1896 |
| 598,671 | Driver | Feb. 8, 1898 |
| 961,554 | Sweet | June 14, 1910 |
| 1,018,562 | Holmes | Feb. 27, 1912 |
| 1,286,560 | Docter | Dec. 3, 1918 |
| 1,628,531 | Carlson | May 10, 1927 |
| 2,161,992 | Battocchi | June 13, 1939 |
| 2,222,361 | Burns | Nov. 19, 1940 |
| 2,322,459 | Lippold | June 22, 1943 |
| 2,334,960 | Roth et al. | Nov. 23, 1943 |